United States Patent [19]

Myoi et al.

[11] Patent Number: 5,286,097
[45] Date of Patent: Feb. 15, 1994

[54] ANTI-LOCK CONTROL SYSTEM

[75] Inventors: Masaaki Myoi; Shohei Matsuda; Toshio Yahagi, all of Wako, Japan

[73] Assignee: Honda Giken Kogyo Kabushiki Kaisha, Tokyo, Japan

[21] Appl. No.: 897,048

[22] Filed: Jun. 11, 1992

[30] Foreign Application Priority Data

Aug. 23, 1991 [JP] Japan .................. 3-212334

[51] Int. Cl.$^5$ .............................................. B60T 8/24
[52] U.S. Cl. .................................... 303/99; 303/109; 364/426.02
[58] Field of Search ............... 303/91, 95–97, 303/100, 103, 105, 107–109, 111, 99; 364/426.01, 426.03

[56] References Cited

U.S. PATENT DOCUMENTS

| | | | |
|---|---|---|---|
| 4,070,562 | 1/1978 | Kuno et al. | 303/97 X |
| 4,384,330 | 5/1983 | Matsuda et al. | 303/97 X |
| 4,392,202 | 7/1983 | Matsuda | 303/109 X |
| 4,430,714 | 2/1984 | Matsuda et al. | 303/105 X |
| 4,446,522 | 5/1984 | Sato et al. | 303/105 X |
| 4,669,045 | 5/1987 | Kubo | 303/105 X |
| 4,704,684 | 11/1987 | Kubo | 364/426 |
| 4,738,492 | 4/1988 | Matsuda | 303/109 X |
| 4,825,371 | 4/1989 | Hoashi et al. | 303/97 X |
| 4,923,255 | 5/1990 | Braschel et al. | 303/97 |

Primary Examiner—Robert J. Oberleitner
Assistant Examiner—A. Fred Muratori
Attorney, Agent, or Firm—Armstrong, Westerman, Hattori, McLeland & Naughton

[57] ABSTRACT

An anti-lock control system includes wheel speed detecting device, wheel acceleration/deceleration detecting device, vehicle pseudo-speed calculating device for calculating a vehicle pseudo-speed on the basis of a wheel speed detected by the wheel speed detecting device, storing device for storing a wheel speed or vehicle pseudo-speed at a sampling time at which the wheel acceleration/deceleration has become equal to or less than preset acceleration set at a value near "0" (zero), including "0" (zero), after passing a peak in the course of increasing of the wheel speed, speed difference calculating device for calculating a speed difference between wheel speeds or vehicle pseudo-speeds stored currently and last time in the storing device, lapsed-time counting device for counting the time lapsed from the last sampling time to the current sampling time, and division device for dividing the speed difference by the lapsed time to provide a value corresponding to a friction coefficient of a road surface. In this anti-lock control system, a value corresponding to a friction coefficient can be obtained with a good accuracy without any influence by an instantaneous behavior of a wheel.

4 Claims, 5 Drawing Sheets

SPEED

WHEEL ACCELERATION/ DECELERATION

ANTI-LOCK CONTROL SYSTEM

BACKGROUND OF THE INVENTION

1. Field of the Invention

The present invention relates to an anti-lock control system and, more particularly, to an anti-lock control system designed such that a value corresponding to a friction coefficient of a road surface on which a vehicle travels can be obtained, to enable an anti-lock control corresponding to the friction coefficient of the road surface.

2. Description of the Prior Art

An anti-lock control system is conventionally known from Japanese Patent Application Laid-Open No. 44039/80, which is designed, such that, the magnitude of friction coefficient of a road surface on which a vehicle travels is judged by the magnitude of a peak value of an acceleration in the course of restoring wheel speed to vehicle speed. An anti-lock control system is also conventionally known from Japanese Patent Application Laid-Open No. 155161/87, which is designed, such that, the magnitude of friction coefficient of a road surface on which a vehicle travels is judged by the magnitude of a restoring time between two speed points in the course of restoring of the wheel speed to a vehicle speed.

However, in the anti-lock control system disclosed in Japanese Patent Application Laid-Open No. 44039/80, the magnitude of friction coefficient is judged by measuring an acceleration at a pin point, and in the antilock control system disclosed in Japanese Patent Application Laid-Open No. 155161/87, a span between the measuring times is short. Therefore, in both such prior art anti-lock control systems, the judgement of the magnitude of friction coefficient is governed by an instantaneous behavior of the wheel. For this reason, it is difficult to judge the magnitude of friction coefficient, when the variations in wheel speed $V_w$ with respect to the vehicle speed $V_{BL}$ during travelling of the vehicle on a road surface of a low friction coefficient and the vehicle speed $V_{BH}$ during travelling of the vehicle on a road surface of a high friction coefficient are substantially equal.

SUMMARY OF THE INVENTION

Accordingly, it is an object of the present invention to provide an anti-lock control system wherein a value, corresponding to a friction coefficient, can be obtained with a good accuracy without any influence by an instantaneous behavior of the wheel.

To achieve the above object, according to a first aspect and feature of the present invention, there is provided an anti-lock control system comprising wheel speed detecting means; wheel acceleration/deceleration detecting means; vehicle pseudo-speed calculating means for calculating a vehicle pseudo-speed on the basis of a wheel speed detected by the wheel speed detecting means; storing means for storing a wheel speed or vehicle pseudo-speed at a sampling time at which the wheel acceleration/deceleration has become equal to or less than a preset acceleration set at a value near "0" (zero), including "0" (zero), after passing a peak in the course of increasing of the wheel speed; speed difference calculating means for calculating a speed difference between wheel speeds or vehicle pseudo-speeds, stored currently and the last time in the storing means; lapsed-time counting means for counting the time lapsed from the last sampling time to the current sampling time; and division means for dividing the speed difference by the lapsed time to provide a value corresponding to a friction coefficient of a road surface.

With the first feature of the present invention, the value corresponding to the friction coefficient of the road surface can be obtained without any influence by an instantaneous behavior of a wheel, and contributes to an enhancement in accuracy of an anti-lock control.

In addition to the above first feature, a second feature of the present invention is that the anti-lock control further includes set value output means for outputting a previously set value corresponding to the friction coefficient, in place of an output from the division means, when the lapsed time is out of a predetermined set range.

With the second feature of the present invention, the occasion of an extreme variation in behavior of the wheel can be eliminated, and an erroneous operation, in the case of the extreme variation in behavior of the wheel, can be avoided.

In addition to the above first feature, a third feature of the present invention is that the time of start of restoring and increasing of braking pressure is set at the sampling time.

With the third feature of the present invention, a value corresponding to a friction coefficient can be obtained using data at the time when the wheel speed is highest.

Further, in addition to the above first feature, a fourth feature of the present invention is that the braking pressures of a plurality of wheels are collectively controlled, the sampling time is a time when the wheel acceleration of one of the plurality of wheels, which is liable to become locked, has become equal to or less than the preset acceleration after passing the peak, and the highest wheel speed of all the wheels, or a vehicle pseudo-speed calculated on the basis of the highest wheel speed, is inputted to the storing means at the sampling time.

With the fourth feature of the present invention, the accuracy of control can be enhanced by determining a storing timing for one of a plurality of synchronous wheel speeds, whose behavior is significant and, thus, the wheel speed which is closest to the vehicle speed can be stored.

The above and other objects, features and advantages of the invention will become apparent from a consideration of the following description of the preferred embodiment, taken in conjunction with the accompanying drawings.

BRIEF DESCRIPTION OF THE DRAWINGS

FIGS. 1 to 4 illustrate one embodiment of an anti-lock control system according to the present invention, wherein

DESCRIPTION OF THE PREFERRED EMBODIMENTS

The present invention will now be described by way of a preferred embodiment in connection with the accompanying drawings.

Figure 1:
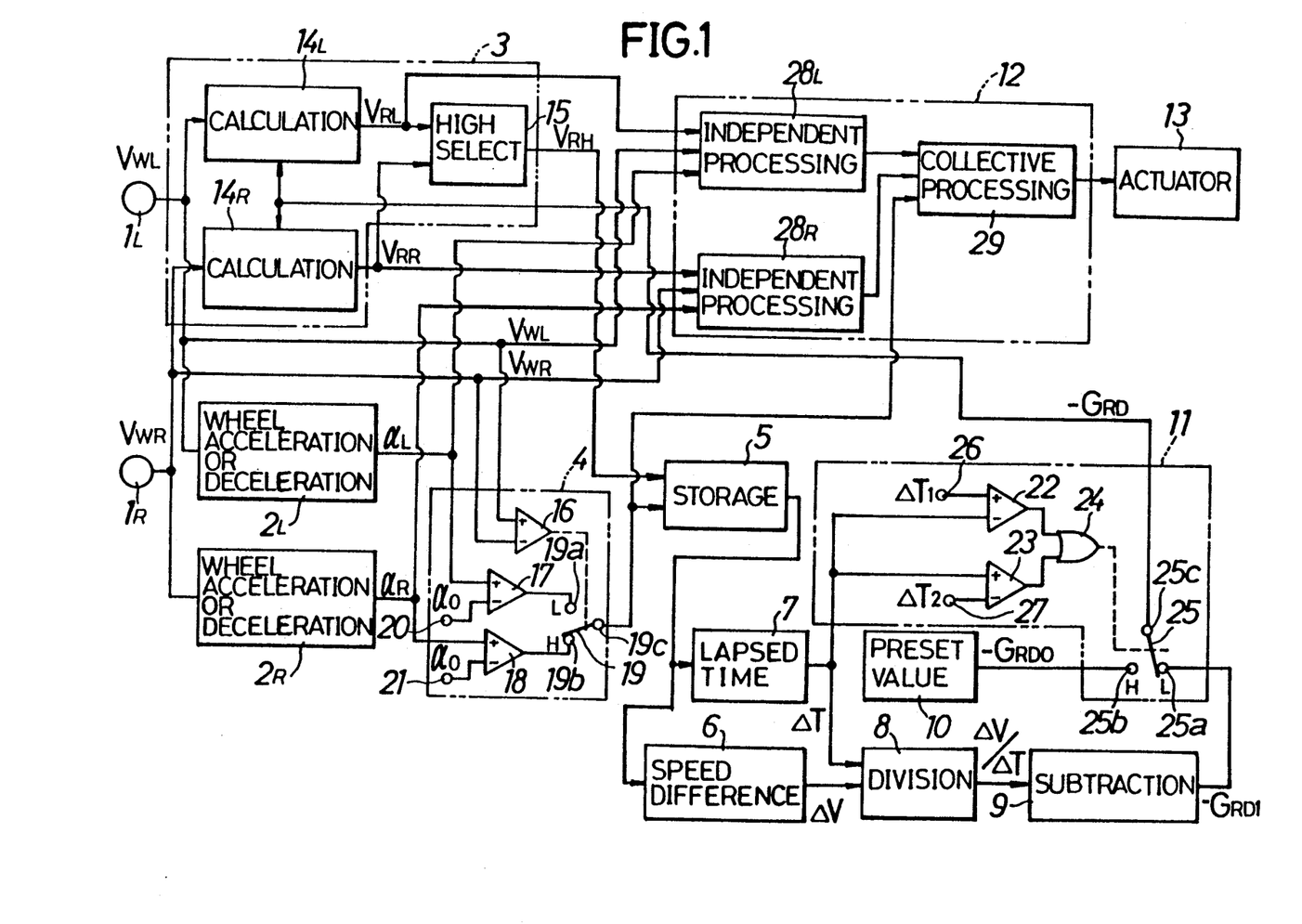
FIG. 1 is a block circuit diagram illustrating the entire arrangement.

FIG. 1 is a block circuit diagram illustrating an arrangement of a preferred embodiment of an anti-lock control system according to the present invention. The anti-lock control system operates to collectively control braking pressures for left and right rear wheels of a vehicle and comprises wheel speed detecting means $1_L$ and $1_R$ for independently detecting wheel speeds $V_{WL}$ and $V_{WR}$ of the left and right rear wheels, wheel acceleration/deceleration detecting means $2_L$ and $2_R$ for providing wheel acceleration/deceleration values $\alpha_L$ and $\alpha_R$ of the left and right wheels, respectively, from the wheel speeds $V_{WL}$ and $V_{WR}$, vehicle pseudo-speed calculating means 3 for providing a vehicle pseudo-speed $V_{RH}$ on the basis of the wheel speeds $V_{WL}$ and $V_{WR}$, sampling-time determination means 4 for determining a sampling time, and storing means 5 for storing the vehicle pseudo-speed $V_{RH}$ at the sampling time determined by the sampling-time determination means 4. The anti-lock control system further includes speed-difference calculating means 6 for calculating a speed difference $\alpha V$ between a vehicle pseudo-speed $V_{RH(n-1)}$ stored the last time in the storing means 5 and a vehicle pseudo-speed $V_{RH(n)}$ stored, currently, in the storing means 5, lapsed-time counting means 7 for counting a lapsed time $\Delta T$ from the last sampling time to the currently sampling time, division means 8 for dividing the speed difference $\Delta V$ by the lapsed time $\Delta T$ to provide a value corresponding to a friction coefficient of a road surface, i.e., a deceleration ($\Delta V/\Delta T$) during execution of an anti-lock control, a subtraction means 9 for subtracting an offset value ($\Delta G$) from the deceleration ($\Delta V/\Delta T$) to provide a deceleration ($-G_{RD1}$), set-value output means 10 for producing a set deceleration ($-G_{RDO}$) as a preset value corresponding to the friction coefficient, switchover means 11 for selecting any one of outputs from the subtraction means 9 and the set-value output means 10, depending upon whether or not the lapsed time $\Delta T$ counted by the lapsed-time counting means 7 is within a predetermined set range, and a control circuit 12 for providing a control signal to an actuator 13, which controls the braking pressure of both the rear wheels.

The wheels speeds $V_{WL}$ and $V_{WR}$ of the left and right rear wheels, detected by the wheel speed detecting means $1_L$ and $1_R$, are independently supplied to the wheel acceleration/deceleration detecting means $2_L$ and $2_R$ which differentiate the wheel speeds $V_{WL}$ and $V_{WR}$ to provide Wheel acceleration/decelerations $\alpha_L$ and $\alpha_R$.

The vehicle pseudo-speed calculating means 3 is comprised of a left rear wheel calculating circuit $14_L$, for calculating a vehicle pseudo-speed $V_{RL}$ on the basis of the left rear Wheel speed $V_{WL}$ provided in the wheel speed detecting means $1_L$, a right rear wheel calculating circuit $14_R$ for calculating a vehicle pseudo-speed $V_{RR}$ on the basis of the right rear wheel speed $V_{WR}$ provided in the wheel speed detecting means $1_R$, and a high select circuit 15 for selecting higher one of the vehicle pseudo-speeds $V_{RL}$ and $V_{RR}$, outputted from the calculating circuits $14_L$ and $14_R$, to output the selected higher one of the vehicle pseudo-speeds as a vehicle pseudo-speed $V_{RH}$.

In the left rear wheel calculating circuit $14_L$, depending upon whether or not an acceleration/deceleration $\{(V_{RL(n-1)} - V_{WL(n)})/\Delta T_c\}$, provided by dividing a value of the current wheel speed $V_{WL(n)}$ subtracted from the last vehicle pseudo-speed $V_{RL(n-1)}$ by a time $\Delta T_c$ of a calculating cycle, is within a range defined by a limit deceleration ($-G_{RD}$) and a limit acceleration ($+G_{RA}$), a vehicle pseudo-speed $V_{RL(n)}$ is calculated in the following manner:

In a range represented by an expression, $-G_{RD} < (V_{RL(n-1)} - V_{WL(n)})/\Delta T_c < +G_{RA}$, $$V_{RL(n)} = V_{RL(n-1)} - \{V_{RL(n-1)} - V_{WL(n)}\} = V_{WL(n)};$$

in a range represented by an expression, $(V_{RL(n-1)} - V_{WL(n)})/\Delta T_c \leq -G_{RD}$, $$V_{RL(n)} = V_{RL(n-1)} - G_{RD} \times \Delta T_c;$$ or in a range represented by an expression, $+G_{RA} \leq (V_{RL(n-1)} - V_{WL(n)})/\Delta T_c$, $$V_{RL(n)} = V_{RL(n-1)} + G_{RA} \times \Delta T_c.$$

Figure 2:
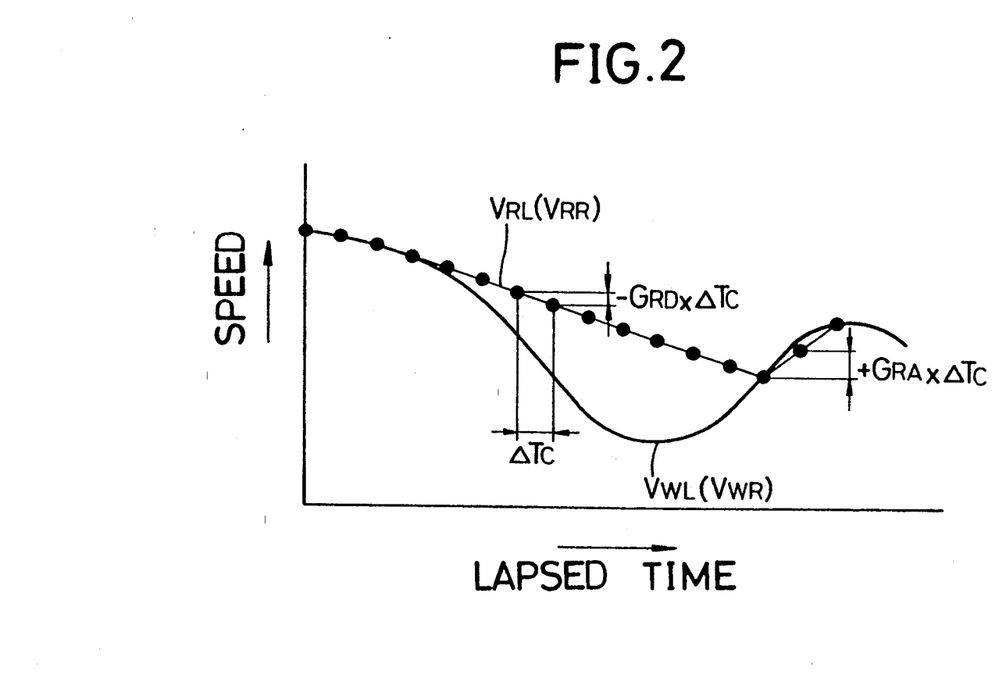
FIG. 2 is a graph illustrating a relationship between the wheel speed and the vehicle pseudo-speed.

This gives the vehicle pseudo-speed $V_{RL}$, varied as shown in FIG. 2, with respect to the wheel speed $V_{WL}$.

On the other hand, in the right rear wheel calculating circuit $14_R$, a vehicle pseudo-speed $V_{RR(n)}$ is calculated in the same manner as in the left rear wheel calculating circuit $14_L$:

In a range represented by an expression, $-G_{RD} < (V_{RR(n-1)} - V_{WR(n)})/\Delta T_c < +G_{RA}$, $$V_{RR(n)} = V_{RR(n-1)} - \{V_{RR(n-1)} - V_{WR(n)}\} = V_{WR(n)};$$

in a range represented by an expression, $(V_{RR(n-1)} - V_{WR(n)})/\Delta T_c \leq -G_{RD}$, $$V_{RR(n)} = V_{RR(n-1)} - G_{RD} \times \Delta T_c;$$ or in a range represented by an expression, $+G_{RA} \leq (V_{RR(n-1)} - V_{WR(n)})/\Delta T_c$, $$V_{RR(n)} = V_{RR(n-1)} + G_{RA} \times \Delta T_c.$$

The limit acceleration ($+G_{RA}$) is previously determined in view of a maximum acceleration assumed during travelling of the vehicle and a variation in wheel speed during travelling of the vehicle on a bad or muddy road, as well as a gradient of increase in wheel speeds during an anti-lock control and the like. The limit deceleration ($-G_{RD}$) is supplied as a value varied in correspondence to the friction coefficient of a road surface on which the vehicle travels, from the switchover means 11 to both the rear wheel calculating circuits $14_L$ and $14_R$.

The sampling-time determination circuit 4 comprises comparators 16, 17 and 18, and a switch 19, whose switching mode is changed over in response to an output from the comparator 16. The wheel speed $V_{WL}$ obtained in the wheel speed detecting means $1_L$ is applied to a non-inverted input terminal of the comparator 16, and the wheel speed $V_{WR}$, obtained in the wheel speed detecting means $1_R$, is applied to an inverted input terminal of the comparator 16. Thus, the comparator 16 produces a high level signal when the left rear wheel speed $V_{WL}$ is larger than the right rear wheel speed $V_{WR}$, and produces a low level signal when the right rear wheel speed $V_{WR}$ is larger than the left rear wheel speed $V_{WL}$. The wheel acceleration/deceleration $\alpha_L$ obtained in the wheel acceleration/deceleration detecting means $2_L$, is applied to a non-inverted input terminal of the comparator 17, and a preset acceleration $\alpha_O$, set at a value near zero (0), including zero (0), is supplied from a reference terminal 20 to an inverted input terminal of the comparator 17. Further, the wheel acceleration/deceleration $\alpha_R$ obtained in the wheel acceleration/deceleration detecting means $2_R$ is applied to a non-inverted input terminal of the comparator 18, and the preset acceleration $\alpha_O$ is supplied from the reference terminal 21 to an inverted input terminal of the comparator 18. Thus, each of the comparators 17 and 18 produces a high level signal, when the wheel acceleration/deceleration $\alpha_L$, $\alpha_R$ is larger than the preset acceleration $\alpha_O$, and produces a low level signal, when the wheel acceleration/deceleration $\alpha_L$, $\alpha_R$ is equal to or smaller than the preset acceleration $\alpha_O$.

The switch 19 is adapted to switch over the electric connection and disconnection between a common contact 19c and a separate contact 19a connected to an output terminal of the comparator 17, as well as a separate contact 19b connected to an output terminal of the comparator 18, and so that the separate contact 19b is electrically connected to the common contact 19c, when the left rear wheel speed $V_{WL}$ is larger than the right rear wheel speed $V_{WR}$ and the comparator 16 produces the high level signal, whereas the separate contact 19a is electrically connected to the common contact 19c, when the right rear wheel speed $V_{WR}$ is larger than the left rear wheel speed $V_{WL}$ and the comparator 16 produces the low level signal. In other words, on the one hand, when the left rear wheel speed $V_{WL}$ is larger than the right rear wheel speed $V_{WR}$, a result of comparison of the right rear wheel acceleration/deceleration $\alpha_R$ with the preset acceleration $\alpha_O$ is outputted from the common contact 19c, and on the other hand, when the right rear wheel speed $V_{WR}$ is larger than the left rear wheel speed $V_{WL}$, a result of comparison of the left rear wheel acceleration/deceleration $\alpha_L$ with the preset acceleration $\alpha_O$ is outputted from the common contact 19c.

An output from the common contact 19c of the switch 19 and an output from the high select circuit 15 in the vehicle pseudo-speed calculating means 3 are received into the storing means 5, which stores the vehicle pseudo-speed $V_{RH}$ received thereinto from the high select circuit 15 at a sampling time which is set to be a time when the output from the common contact 19c changed from the high level to the low level.

Figure 3A:
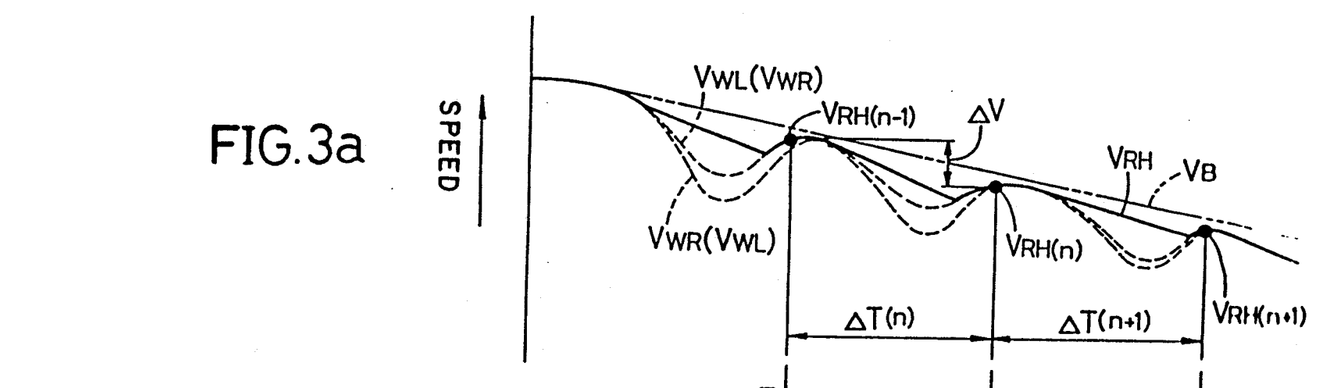
FIGS. 3a and 3b are diagrams for explaining the sampling time, the lapsed-time and the speed difference.
Figure 3B:
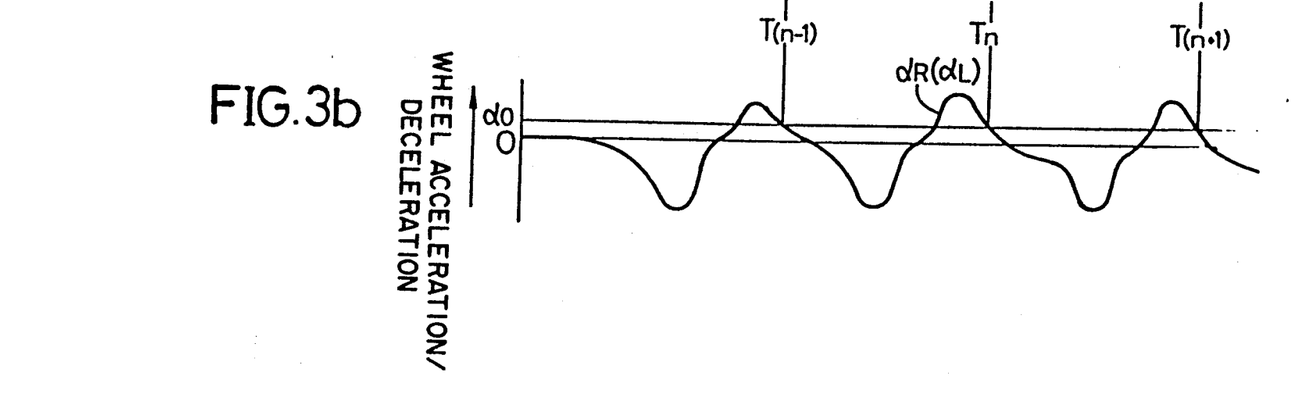

The operation of the storing means 5 and the sampling-time determination means 4 will be described below with reference to FIGS. 3a-3b. In a condition where the left rear wheel speed $V_{WL}$ and the right rear wheel speed $V_{WR}$ (for example, $V_{WL} > V_{WR}$) are varied, as shown by broken lines in FIG. 3a, With respect to an actual vehicle speed $V_B$, the vehicle pseudo-speed $V_{RH}$, received into the storing means 5 from the high select circuit 15 in the vehicle pseudo-speed calculating means 3, is based upon the left rear wheel speed $V_{WL}$. On the other hand, in a condition where the left rear wheel speed $V_{WL}$ is larger than the right rear wheel speed $V_{WR}$, the separate contact 19b and, thus, the comparator 18 is in electrical connection to the common contact 19c of the switch 19 in the sampling-time determination means 4. In this case, when the wheel acceleration/deceleration $\alpha_R$ of the right rear wheel becomes equal to or lower than the preset acceleration $\alpha_O$, after it has passed a peak in the course of increasing of the wheel speeds $V_{WL}$ and $V_{WR}$, as shown in FIG. 3b, vehicle pseudo-speeds $V_{RH(n-1)}$, $V_{RH(n)}$ and $V_{RH(n+1)}$, at sampling times $T_{(n-1)}$, $T_{(n)}$ and $T_{(n+1)}$ when the signal received in the storing means 5 from the sampling-time determination means 4 has been lowered, are sequentially stored in the storing means 5.

In the speed difference calculating means 6, a speed difference $\Delta V$ ($=V_{RH(n)} - V_{RH(n-1)}$) between a vehicle pseudo-speed $V_{RH(n)}$ stored this time, or currently, in the storing means 5 and a vehicle pseudo-speed $V_{RH(n-1)}$, stored the last time in the storing means 5, is calculated. In the lapsed-time counting means 7, a lapsed-time $\Delta T$ from the last sampling time $T_{(n-1)}$ to the current sampling time $T_{(n)}$ is counted.

In the division means 8, FIG. 1, the speed difference $\Delta V$, obtained in the speed difference calculating means 6, is divided by the lapsed time $\Delta T$, obtained in the lapsed-time counting means 7, thereby providing a deceleration ($\Delta V / \Delta T$) as a value corresponding to a friction coefficient of road surface.

In the subtracting means 9, a given value $\Delta G_R$ is subtracted from the deceleration ($\Delta V / \Delta T$), obtained in the division means 8, to provide a limit deceleration ($-G_{RD1}$). That is, the calculation according to the following equation is carried out in the subtracting means 9:

$$-G_{RD1} = \Delta V / \Delta T - \Delta G_R.$$

This limit deceleration ($-G_{RD1}$) is used in the left and right rear wheel calculating circuits $14_L$ and $14_R$ in the vehicle pseudo-speed calculating means 3, and the vehicle pseudo-speeds $V_{RL}$ and $V_{RR}$ are provided using the limit deceleration ($-G_{RD1}$) in consideration of the deceleration ($\Delta V / \Delta T$) corresponding to a friction coefficient of road surface, leading to an increased accuracy of estimation of the vehicle pseudo-speeds $V_{RL}$ and $V_{RR}$.

A given deceleration ($-G_{RD0}$), previously set as a maximum deceleration assumed during travelling of the vehicle, is outputted from the set-value output means 10. By the switchover operation of the switchover means 11, depending upon whether the lapsed-time $\Delta T$ obtained in the lapsed-time counting means 7 is within the predetermined set range, either one of the deceleration ($-G_{RD1}$), obtained in the subtracting means 9, and the given deceleration ($-G_{RD0}$), outputted from the set-value output means 10, is selected as a limit deceleration ($-G_{RD}$) and inputted to the left and right rear wheel calculating circuits $14_L$ and $14_R$, respectively.

The switchover means 11 includes comparators 22 and 23, and OR gate 24 and a switch 25. The lapsed-time $\Delta T$, obtained in the lapsed-time counting means 7, is applied to an inverted input terminal of the comparator 22 and a non-inverted input terminal of the comparator 23. On the other hand, a given time $\Delta T_1$ is supplied from a reference terminal 26 to a non-inverted input terminal of the comparator 22, and another given time $\Delta T_2$, set longer than the given time $\Delta T_1$, is supplied from a reference terminal 27 to an inverted input terminal of the comparator 23. Then, outputs from the comparators 22 and 23 are inputted to the OR gate 24 in parallel.

The given time $\Delta T_1$ is set to judge whether or not the period $\Delta T$ of sampling time is as short as it can be decided that the vehicle is travelling on a bad or muddy road. The given time $\Delta T_2$ is set to judge whether or not such period $\Delta T$ is as long as it can be decided that a brake pedal is being depressed with a low force for braking during travelling of the vehicle on a road surface of a relatively high friction coefficient.

A low level signal is outputted from the OR gate 24, only when $\Delta T_1 \leq \Delta T \leq \Delta T_2$, i.e., only when the vehicle is not travelling on a bad or muddy road and the brake pedal is being not depressed with a low force for braking during travelling of the vehicle on a road surface of a high friction coefficient. A high level signal is outputted from the OR gate 24, either when $\Delta T < \Delta T_1$, i.e., when it has been decided that the vehicle is travelling on a bad or muddy road, or when $\Delta T_2 < \Delta T$, i.e., when it has been decided that the brake pedal is being depressed with a low depression force for braking during travelling of the vehicle on the road surface of the high friction coefficient.

The switch 25 is adapted to switch over the electrical connection and disconnection between a separate contact 25a, connected to an output terminal of the subtracting means 9, as well as a separate contact 25b, connected to an output terminal of the set-value output means 10, and a common contact 25c, connected to the left and right rear wheel calculating circuit $14_L$ and $14_R$ in the vehicle pseudo-speed calculating means 3. When the output from the OR gate 24 is of a low level, the separate contact 25a is electrically connected to the common contact 25c, and when the output from the OR gate 24 is of a high level, the separate contact 25b is electrically connected to the common contact 25c. In other words, when the vehicle is not travelling on a bad or muddy road and the brake pedal is being not depressed with a low force for braking during travelling of the vehicle on the road surface of the high friction coefficient, the deceleration $(-G_{RD1})$ obtained in the subtracting means 9 is inputted as the limit deceleration $(-G_{RD})$ into the left and right rear wheel calculating circuits $14_L$ and $14_R$. When it has been decided that the vehicle is travelling on the bad or muddy road, or when it has been decided that the brake pedal is being depressed with a low force for braking during travelling of the vehicle on the road surface of the high friction coefficient, the given deceleration $(-G_{RD0})$, outputted from the set-value output means 10, is inputted as the limit deceleration $(-G_{RD})$ into the left and right rear wheel calculating circuits $14_L$ and $14_R$.

The control circuit 12 includes a left rear wheel independently-calculation section $28_L$, a right rear wheel independently-calculating section $28_R$ and a collective control section 29. The left rear wheel speed $V_{WL}$, obtained in the wheel speed detecting means $1_L$, the vehicle pseudo-speed $V_{RL}$ from the left rear wheel calculating circuit $14_L$ in the vehicle pseudo-speed calculating means 3 and the left rear Wheel acceleration/deceleration $\alpha_L$, obtained in the wheel acceleration/deceleration detecting means $2_L$, are inputted to the left rear wheel independently-calculating section $28_L$. And the right rear wheel speed $V_{WR}$, obtained in the Wheel speed detecting means $1_R$, the vehicle pseudo-speed $V_{RR}$ from the right rear wheel calculating circuit $14_R$ in the vehicle pseudo-speed calculating means 3 and the right rear wheel acceleration/deceleration $\alpha_R$, obtained in the wheel acceleration/deceleration detecting means $2_R$, are inputted to the right rear wheel independently-calculating section $28_R$.

In the left rear wheel independently-calculating section $28_L$, it is judged whether or not the left rear wheel is about to enter a locked state during braking, on the basis of the left rear wheel speed $V_{WL}$, a target wheel speed resulting from multiplication of the vehicle pseudo-speed $V_{RL}$ corresponding to the left rear wheel by a given slip rate, and the left rear wheel acceleration/deceleration $\alpha_L$. Further, a control signal, indicative of a command to reduce, maintain or increase the braking pressure, depending upon a result of judgement, is inputted to the collective control section 29 from the left rear wheel independently-calculating section $28_L$.

In the right rear wheel independently-calculating section $28_R$, it is judged whether or not the right rear wheel is about to enter a locked state during braking, on the basis of the right rear wheel speed $V_{WR}$, a target wheel speed resulting from multiplication of the vehicle pseudo-speed $V_{RR}$ corresponding to the right rear wheel by a given slip rate, and the right rear wheel acceleration/deceleration $\alpha_R$. Further, a control signal, indicative of a command to reduce, maintain or increase the braking pressure, depending upon a result of judgement, is received into the collective control section 29 from the right rear wheel independently-calculating section $28_R$.

The collective control section 29 selects one of the control signals for one of the rear wheels which is liable to become locked, on the basis of control signals, received from the independently-calculating sections $28_L$ and $28_R$, to control the operation of the actuator 13, thereby collectively controlling the braking pressures for both the rear wheels. Moreover, the common contact 19c of the switch 19, in the sampling-time determination means 4, is connected to the collective control section 29, and the collective control section 29 performs a braking-pressure restoring and increasing control with its starting time synchronized with a sampling time determined by the sampling-time determination means 4.

The operation of this embodiment will be described below. In calculating vehicle pseudo-speeds $V_{RL}$ and $V_{RR}$ during an anti-lock control, an instant when a wheel acceleration/deceleration of lower one of the wheel speeds of the rear wheels, in the course of increasing the wheel speeds, e.g., $\alpha_L$, has become lower than the preset acceleration $\alpha_O$, after passing a peak, is determined as a sampling time, the vehicle pseudo-speed $V_{RH}$ outputted from vehicle pseudo-speed calculating means 3 at such sampling time, i.e., higher one of vehicle pseudo-speed values $V_{RL}$ and $V_{RR}$, calculated on the basis of the wheel speeds $V_{RL}$ and $V_{RR}$ of the rear wheels, is stored in the storing means 5.

In this manner, the vehicle pseudo-speed $V_{RH}$ is stored in the storing means 5 at every sampling time determined by the sampling-time determination means 4. Thus, a deceleration $\Delta V/\Delta T$, corresponding to a friction coefficient of road surface, can be provided by dividing a difference $\Delta V$ between the vehicle pseudo-speeds $V_{RH(n)}$ and $V_{RH(n-1)}$ stored in the storing means 5 at the current sampling time and the last sampling time by an interval between the sampling times, i.e., a countered time $\Delta T$. A deceleration $(-G_{RD1})$, calculated by using such deceleration $\Delta V/\Delta T$, is determined as a limit deceleration $(-G_{RD})$, whereby vehicle pseudo-speeds $V_{RL}$ and $V_{RR}$, as well as a target wheel speed, can be determined in correspondence to the friction coefficient of road surface, which enables an accurater anti-lock control.

Moreover, when the above-described countered time $\Delta T$ is smaller than $\Delta T_1$ ($\Delta T < \Delta T_1$), i.e., as short as it is decided that the vehicle is travelling on a bad or muddy road, as well as when $\Delta T_2 < \Delta T$, i.e., when such countered time $\Delta T$ is as long as it is decided that the brake pedal is being depressed with a low depression force for braking during travelling of the vehicle on a road surface of a high friction coefficient, the given deceleration $(-G_{RD0})$ is used as the limit deceleration $(-G_{RD})$. Therefore, it is avoided that the limit deceleration $(-G_{RD})$ is erroneously set, and a value ($\Delta V/\Delta T$), corresponding to the friction coefficient of road surface, can be determined with a good accuracy without any influence by an instantaneous behavior of the wheel, leading to an improved accuracy of the anti-lock control.

In addition, the control accuracy can be further increased, because the sampling time is determined by lower one of the wheel speeds of the rear wheels operated synchronously, i.e., the wheel speed of one of the rear wheels whose behavior is significant, and the vehicle pseudo-speed $V_{RH}$, stored in the storing means 5, is a higher speed selected from the vehicle pseudo-speed values.

Further, a value corresponding to a friction coefficient of road surface can be obtained using data when the wheel speed is highest at the start of restoring increase of the braking pressure synchronized with the sampling time.

Figure 4:
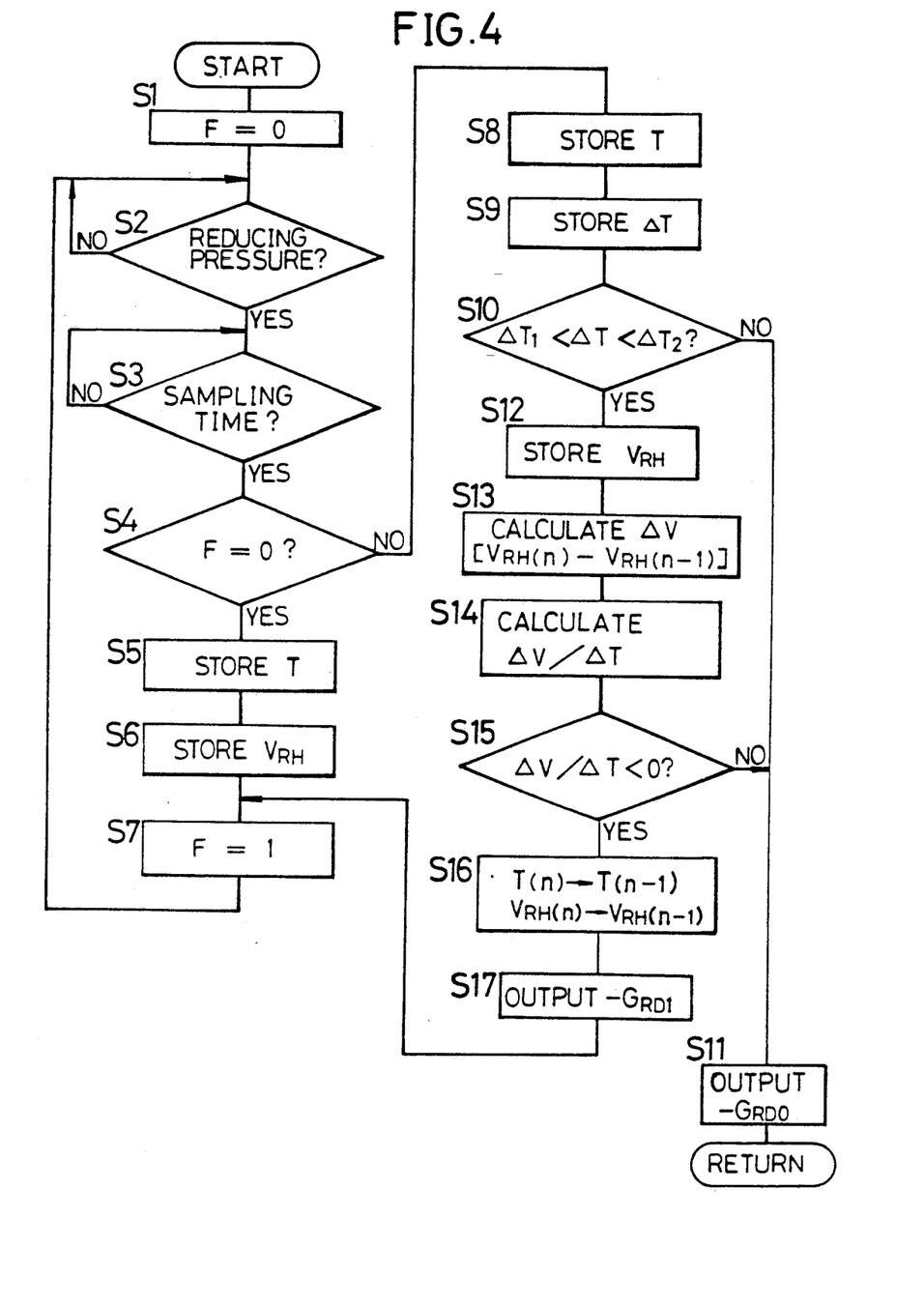
FIG. 4 is a flow chart illustrating a procedure of processing by a computer.
Figure 5:
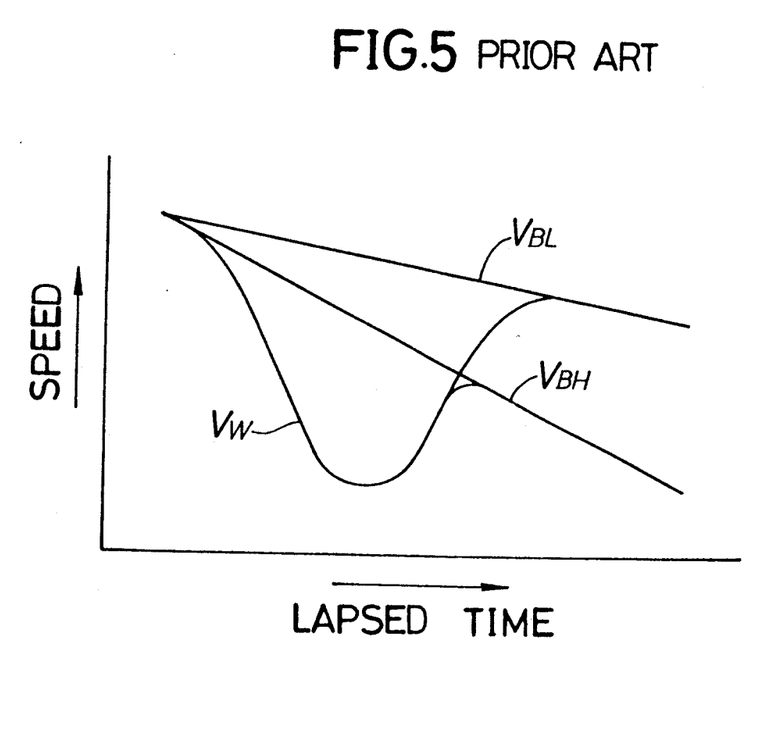
FIG. 5 is a graph for explaining the disadvantage associated with the prior art.

A series of the above-described processings may be carried out by a computer, and in this case, a processing procedure thereof is as shown in FIG. 4.

At a first step S1, a flag F is set at "0", and at a second step S2, it is judged whether or not the braking pressure is being reduced. When the braking pressure is not being reduced, the processing is advanced to a third step S3 at which it is judged whether or not a sampling time has been now reached.

When it has been decided at the third step S3 that it is now a sampling time, it is judged at a fourth step S4 whether or not the flag F is "0". If F=0, then time T and vehicle pseudo-speed $V_{RH}$ are stored at fifth and sixth steps S5 and S6, respectively. The flag F is set at "1" at a seventh step S7 and thereafter, the processing is returned to the second step S2.

When the sampling time has been reached, the flag F is at "1" and, hence, the processing is advanced from the fourth step S4 to an eighth step S8. The processing is advanced to a ninth step S9 past the eighth step S8 and at the ninth step S9, a lapsed time $\Delta T$ between the sampling times is calculated. Further, at the tenth step S10, it is judged whether or not the lapsed time $\Delta T$ satisfies a relation of $\Delta T_1 < \Delta T < \Delta T_2$. When such relation is not satisfied, the given deceleration $(-G_{RD0})$ is outputted at an eleventh step S11. But if the relation of $\Delta T_1 < \Delta T < \Delta T_2$ is satisfied at the tenth step S10, a vehicle pseudo-speed $V_{RH}$ at the current sampling time is stored at a twelfth step S12, and a speed difference $\Delta V$ is calculated at a thirteenth step S13 and, thereafter, the calculation of $\Delta V/\Delta T$ is carried out at a fourteenth step S14.

At a fifteenth step S15, it is judged whether or not the $\Delta V/\Delta T$ indicates a negative value, i.e., a deceleration. If the $\Delta V/\Delta T$ indicates a positive value, i.e., an acceleration, then the processing is advanced to the eleventh step S11. If the $\Delta V/\Delta T$ indicates a deceleration, then the processing is advanced to a sixteenth step S16.

At the sixteenth step S16, the current sampling time $T_{(n)}$ is restored as the last sampling time $T_{(n-1)}$, and the current vehicle pseudo-speed $V_{RH(n)}$ is restored as the last vehicle pseudo-speed $V_{RH(n-1)}$. At a seventeenth step S17, the deceleration $(-G_{RD1})$ is outputted, returning to the seventh step S7.

In the above-described embodiment, the limit deceleration $(-G_{RD})$ for the calculation of the vehicle pseudo-speed has been corrected from the deceleration $\Delta V/\Delta T$ obtained as a value corresponding to the friction coefficient, but the magnitude of friction coefficient may be determined from the $\Delta V/\Delta T$, and a control may be carried out with a relatively large gradient of increase in braking pressure at the time of restoring and increasing of the braking pressure, when the magnitude of friction coefficient is high, and, on the other hand, with a relatively small gradient of increase in braking pressure, when the magnitude of friction coefficient is low.

In addition, the value corresponding to the friction coefficient has been obtained by dividing the speed difference between the vehicle pseudo-speeds by the lapsed time in the above-described embodiment, but the value corresponding to the friction coefficient may be obtained by dividing the speed difference between the wheel speeds by the lapsed time.

What is claimed is:

1. An anti-lock control system comprising:
   wheel speed detecting means;
   wheel acceleration/deceleration detecting means;
   vehicle pseudo-speed calculating means for calculating a vehicle pseudo-speed on the basis of a wheel speed detected by the wheel speed detecting means;
   storing means for storing the wheel speed or vehicle pseudo-speed at sampling times at which the wheel acceleration/deceleration has become equal to or less than a present acceleration set in a range near and including 0 after passing a peak in the wheel speed;
   speed difference calculating means for calculating a speed difference between the wheel speed or vehicle pseudo-speed stored in a current sampling time and the wheel speed or vehicle pseudo-speed stored in a last sampling time in the storing means;
   lapsed-time counting means for counting the time lapsed from the last sampling time to the current sampling time; and
   division means for dividing said speed difference by the lapsed time to provide a value corresponding to a friction coefficient of a road surface.

2. An anti-lock control system according to claim 1, further including set value output means for outputting a previously set value corresponding to the friction coefficient in place of an output from the division means, when the lapsed time is out of a predetermined set range.

3. An anti-lock control system according to claim 1, wherein a time of start of restoring and increasing of braking pressure is set at the current sampling time.

4. An anti-lock control system according to claim 1, wherein braking pressures of a plurality of wheels are collectively controlled, the sampling time is a time when wheel acceleration of one of the plurality of wheels which is liable to become locked has become equal to or less than the present acceleration after passing the peak, and a highest wheel speed of all wheels or the vehicle pseudo-speed calculated on the basis of said highest wheel speed is inputted to said storing means at said current sampling time.

* * * * *